United States Patent [19]
Islas

[11] Patent Number: 5,335,927
[45] Date of Patent: Aug. 9, 1994

[54] PEDALED PROPULSION SYSTEM

[76] Inventor: John J. Islas, 6980 Lincoln Knolls North, Canastota, N.Y. 13032

[21] Appl. No.: 60,090

[22] Filed: May 10, 1993

[51] Int. Cl.$^5$ ............................................. B62M 1/04
[52] U.S. Cl. ...................................... 280/255; 280/254
[58] Field of Search ................. 280/255, 254, 253, 251

[56] References Cited

U.S. PATENT DOCUMENTS

| | | | |
|---|---|---|---|
| 584,200 | 6/1897 | Wheatley | 280/255 |
| 1,581,168 | 4/1926 | Bullermann | 280/251 |
| 2,062,830 | 12/1936 | Sabaeff | 280/254 |
| 3,661,404 | 5/1972 | Bossaer | 280/255 |
| 3,881,747 | 5/1975 | Abbott | 280/255 |
| 4,227,712 | 10/1980 | Dick | 280/255 |
| 4,300,784 | 11/1981 | Efros | 280/255 |
| 4,467,668 | 8/1984 | Tatch | 280/255 |
| 4,574,649 | 3/1986 | Seol | 280/255 |
| 4,630,839 | 12/1986 | Seol | 280/255 |
| 5,104,137 | 4/1992 | Kilts | 280/255 |

FOREIGN PATENT DOCUMENTS

| | | | |
|---|---|---|---|
| 4694 | of 1891 | United Kingdom | 280/254 |
| 15967 | of 1904 | United Kingdom | 280/254 |

Primary Examiner—Margaret A. Focarino
Assistant Examiner—Kevin Hurley
Attorney, Agent, or Firm—Harris Beach & Wilcox

[57] ABSTRACT

A drive mechanism for a pedalled vehicle employs foot levers mounted on the vehicle frame, a rotary drive mechanism, and one way rotary members. A chain or toothed rack can engage the rotary members to provide reciprocal oscillatory motion, which is then converted to one-way rotary motion. A synchronizing mechanism ensures that motion of each lever produces corresponding motion in the opposite direction by the other lever.

6 Claims, 7 Drawing Sheets

PEDALED PROPULSION SYSTEM

BACKGROUND OF THE INVENTION

This invention relates to foot propelled vehicles, such as bicycles, tricycles, or pedaled boats, and is more particularly directed to a pedaled propulsion system in which reciprocating levers are worked by the rider or operator, rather than a rotary crank, to power the wheels or other propulsion mechanism. The invention is certainly not limited to wheeled vehicles but can also be applied to boats or float-supported vehicles, or runner-supported vehicles for snow or ice travel.

A number of foot lever or pedal lever based systems for propelling bicycles have been proposed and some of these are described in the U.S. patent literature. Of some general interest here are Silvano et al. U.S. Pat. Nos. 4,872,695; Hege 3,984,129; and White 1,148,419. Silvano et al. combines a conventional crank and front sprocket with a pedal and slide bar system to change the mechanical advantage of the cranks. Hege describes a reciprocating foot lever system for propelling a bicycle. A strap is coupled to the rear wheel hub and to a respective foot lever arm, and turns the rear wheel, the two sides of the wheel hub operating in turn. The levers are connected to a gear mechanism inside the wheel hub. This is a rather complex arrangement, and requires drastically modifying the rear wheel from the standard chain drive configuration. White employs a rack and pinion system where an arcuate toothed sector engages a toothed sprocket on a rear wheel hub. Spring returns are included to return the foot levers to their upwards positions.

These systems tend to be rather complex and fail to achieve optimal mechanical advantage for the rider.

OBJECTS AND SUMMARY OF THE INVENTION

It is a principal object of this invention to provide a reciprocating action pedal lever system for a bicycle or other rider-propelled vehicle, which is simple and reliable.

It is another object to provide a system which permits optimal mechanical advantage, and can be used in partial or full stroke without difficulty.

According to an aspect of the invention the bicycle or other vehicle has a frame, a drive wheel or other propulsion means, such as a paddle wheel or screw, and a rotary drive mechanism, such as a chain and sprocket drive to turn the rear wheel. Pedal levers are mounted on pivots on left and right sides of the frame, and these have pedal members mounted on them. The pivots can favorably be mounted on or near the chain stays somewhat offset from the rear wheel dropouts. A synchronizing mechanism, for example formed of a flexible web such as a cable, belt, or chain, in a loop and travels over a pulley arrangement mounted on the frame. This web is attached on one side to the left lever and on the other side to the right lever, and produces a reciprocal motion such that when one lever descends, the other rises correspondingly. The chain drive, or other rotary drive mechanism, has a rotary member, such as the bicycle front sprocket, mounted on the frame. Favorably the front sprocket is mounted in a bearing housing partway up the seat tube. Left and right wheels are connected by one-way clutch drive to the front sprocket. In one embodiment a chain, cable, cord, or belt passes over the respective wheel and attaches to the left or right lever to oscillate the wheel as the levers reciprocate up and down. In another embodiment a toothed rack member mounted on the respective lever engages teeth on the wheel to oscillate it. In either case, the clutch drives translate this oscillation into unidirectional rotation, which drives the rear wheel in a forward direction.

The attachment point of the linkage to the pedal levers can be movable to achieve an optimal mechanical advantage. Also the synchronizing mechanism web can also constitute the flexible linkage that turns the respective oscillating left and right wheels that drive the front sprocket. The operator can use either a deep or shallow pedal motion, as desired, without making any mechanical adjustments.

This pedaled propulsion system can be used to advantage on a recumbent bicycle or tricycle, and can also be used on a pedaled boat such as a paddle craft or a screw driven vessel, and can also be employed on a pedaled ice craft or runnered snow vehicle.

The above and many other object features and advantages of this invention will become apparent from the ensuing description of a preferred embodiment, as shown in the attached Drawing.

DETAILED DESCRIPTION OF THE PREFERRED EMBODIMENT

Figure 1:
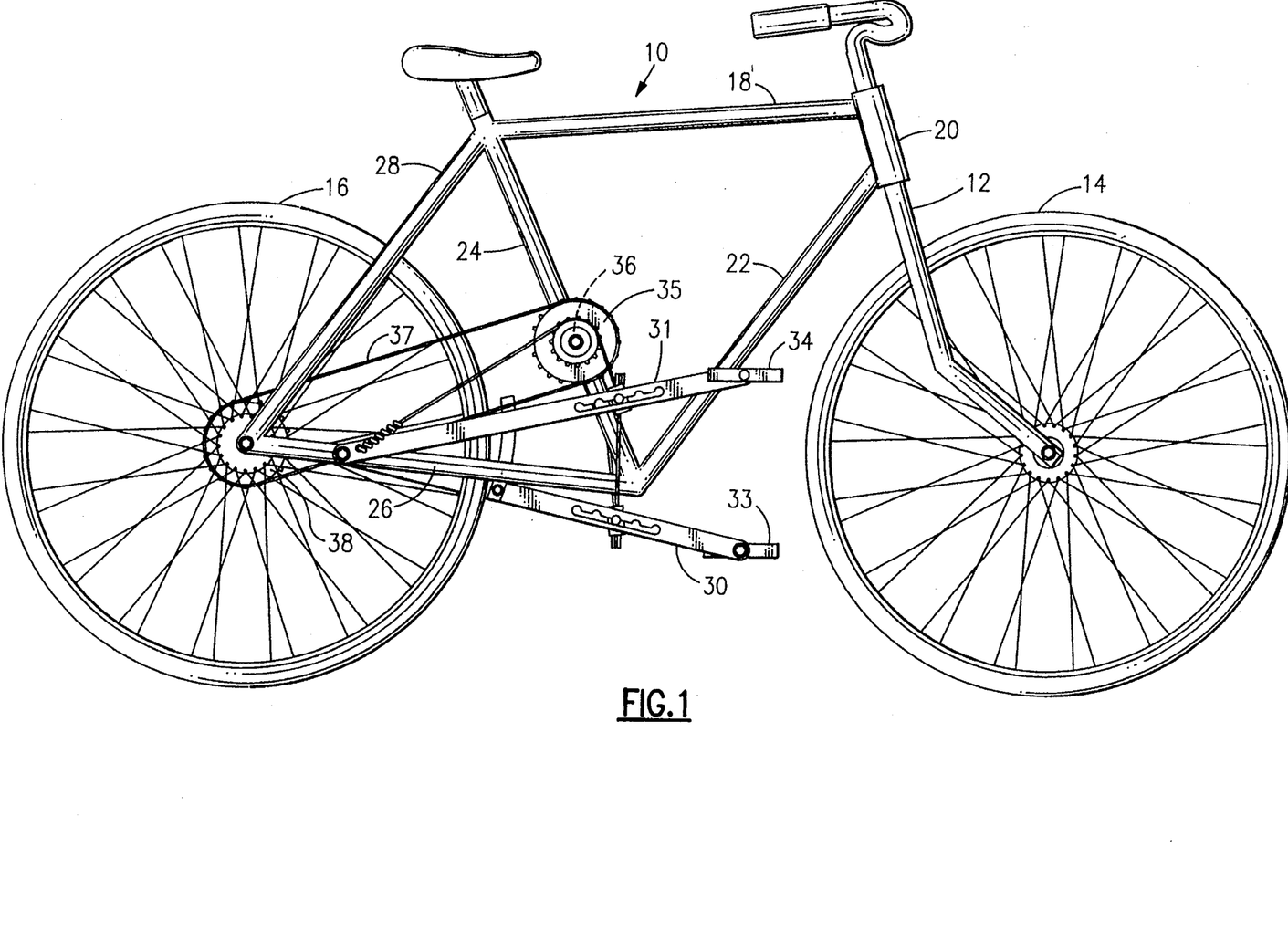
FIG. 1 is a side elevation of a bicycle incorporating the pedaled propulsion arrangement according to one embodiment of this invention.
Figure 2:
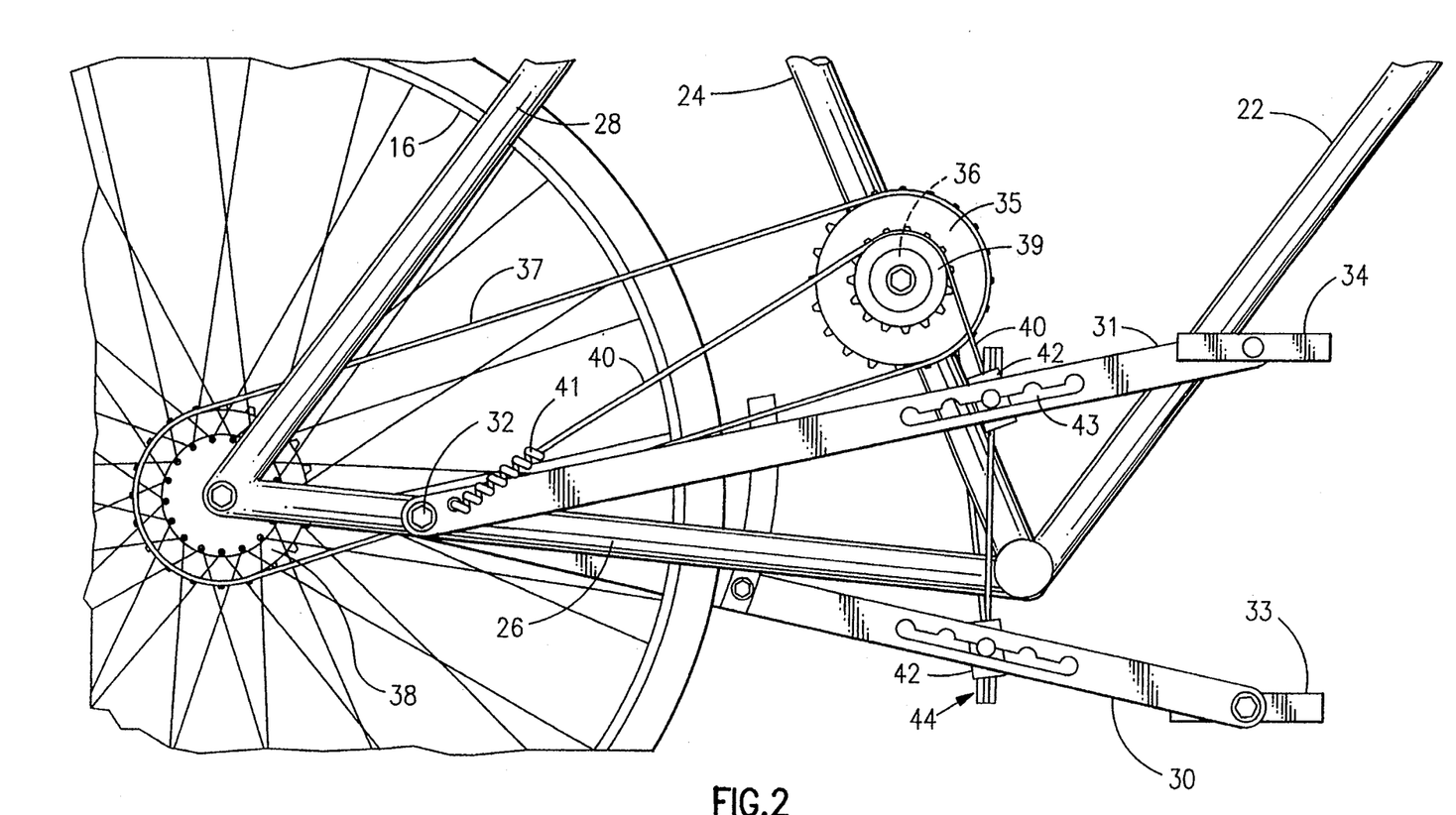
FIG. 2 is an enlargement of a portion of FIG. 1.
Figure 3:
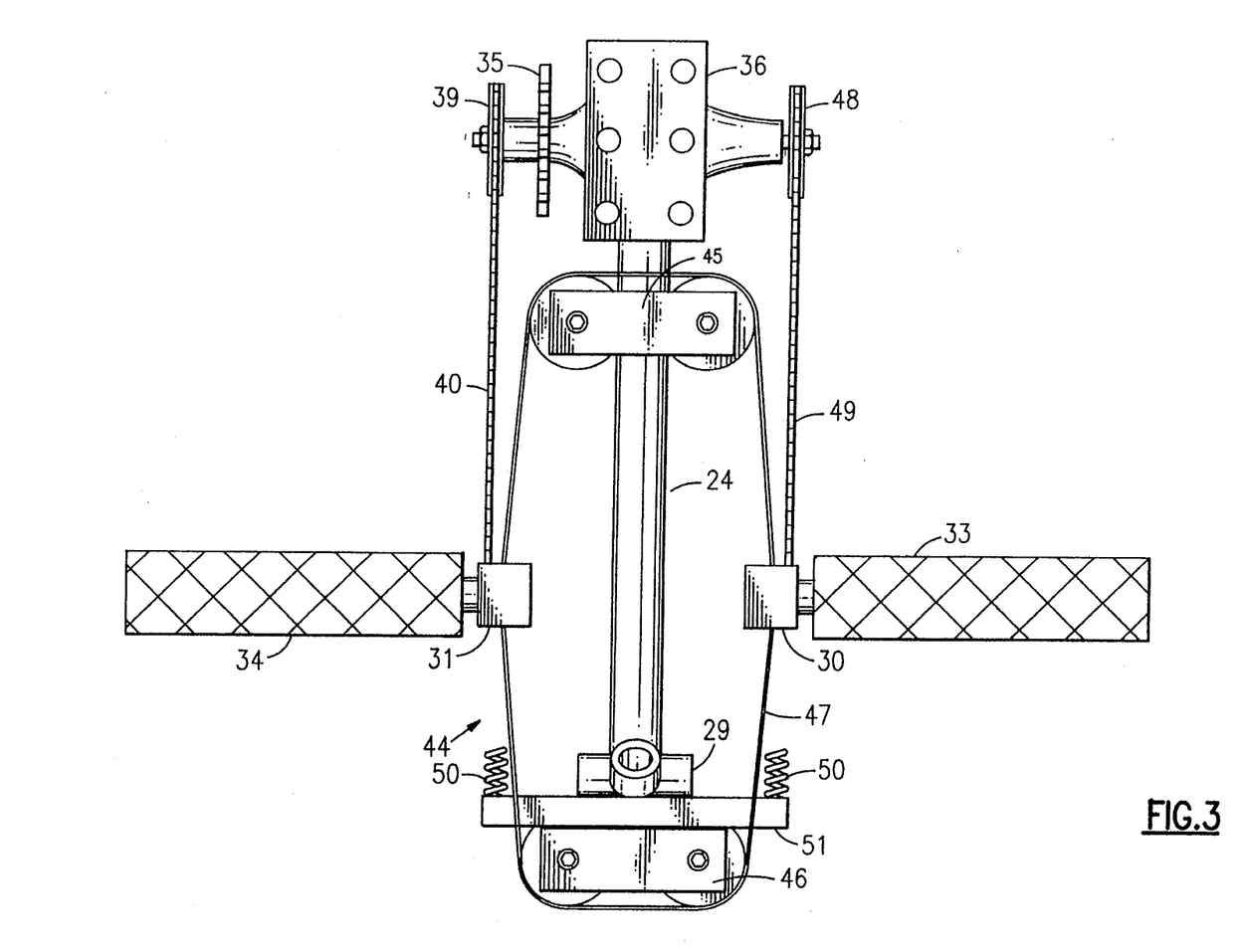
FIG. 3 is a front view of the timing or synchronizing mechanism according to this invention.

With reference to the Drawing, and initially to FIGS. 1-3, a bicycle is shown having a frame 10, a front fork 12, front wheel 14 and rear wheel 16. The frame has an upper horizontal tube 18, a head tube 20 which pivotally mounts the front fork assembly, a down tube 22 and a seat tube 24. A rear fork which mounts the rear wheel is formed of a left and right chain stay 26 and a left and right seat stay 28. A crank housing 29, is affixed at the union of the chain stays 26, the down tube 22 and the seat tube 24.

Also shown in FIG. 1 for example are a seat for positioning the rider on the vehicle, and a handle bar, both being of conventional design in this embodiment.

A pedal lever propulsion system includes a pair of pedal levers 30, 31 pivotally mounted on left and right sides of the rear fork. Here the right lever 31 is mounted on a pivot member 32 affixed to the chain stay 26. The left lever is similarly mounted. There are left and right foot pedals 33, 34 attached at free ends of the pedal levers.

A rotary sprocket member 35 is mounted on a bearing housing 36 partway up the seat tube 24. A bicycle chain 37 runs between this sprocket member 35 and a rear sprocket member 38 to supply drive power to the rear wheel 16.

An outer sprocket 39 is disposed on the same axis as the sprocket 35. This sprocket 39 incorporates a slip clutch bearing or other one-way ratchet type drive mechanism so that oscillatory back and forth motion of the outer sprocket 39 produces one-way rotation of the sprocket 35, and through the chain 37 and sprocket 38, drives the rear wheel to move the bicycle forward. A similar outer sprocket and slip clutch, not shown here, are disposed on the left side and function similarly.

A drive chain, cord, or cable 40 has a rear end connected to a spring 41 attached to the pivot end of the pedal lever 31. This drive chain 40 passes over the sprocket 39 and is attached to an anchor 42 on the pedal lever 31. Another similar arrangement on the left side of the frame is associated with the left pedal lever 30 and a left outer sprocket 48 shown in FIG. 3. The anchor 42 is movable in slot 43 on the lever to change the mechanical advantage of the drive system. Detent recesses are provided in the slot.

As the pedal 34 and the associated lever 31 descend, tension on the chain 40 pulls it over the sprocket 39 to rotate same. The slip clutch mechanism engages and rotates the main sprocket 35. Then when the pedal 34 and lever 31 ascend back to an upper position, the spring 41 returns the chain 40 and rotates the outer sprocket 39 in the other direction. Here the slip clutch releases, permitting the sprocket 35 to freewheel relative to the counter rotating sprocket 39. At this time, the other lever 30 is descending and is supplying rotation to the sprocket 35.

The pedal levers 30,31 move reciprocally, that is, when one descends, the other rises correspondingly. A synchronizing mechanism 44, shown in FIG. 3, is mounted on the seat tube 24 adjacent the crank housing 29.

There are an upper set of idler pulley 45, a lower set of idler pulleys 46, and a web 47, such as a cable or chain, in the form of a closed loop passing over the pulleys 45 and 46. The left lever 30 and right lever 31 are each attached to the web on its respective side of the frame. Also shown here are the chain 40 and sprocket 39, as well as the left-side sprocket 48 and the chain 49 that is attached to the left lever 30.

Bumper springs 50 can be located on a bar 51 at the lower end of the pedal stroke to speed up return motion of each pedal lever.

Figure 4:
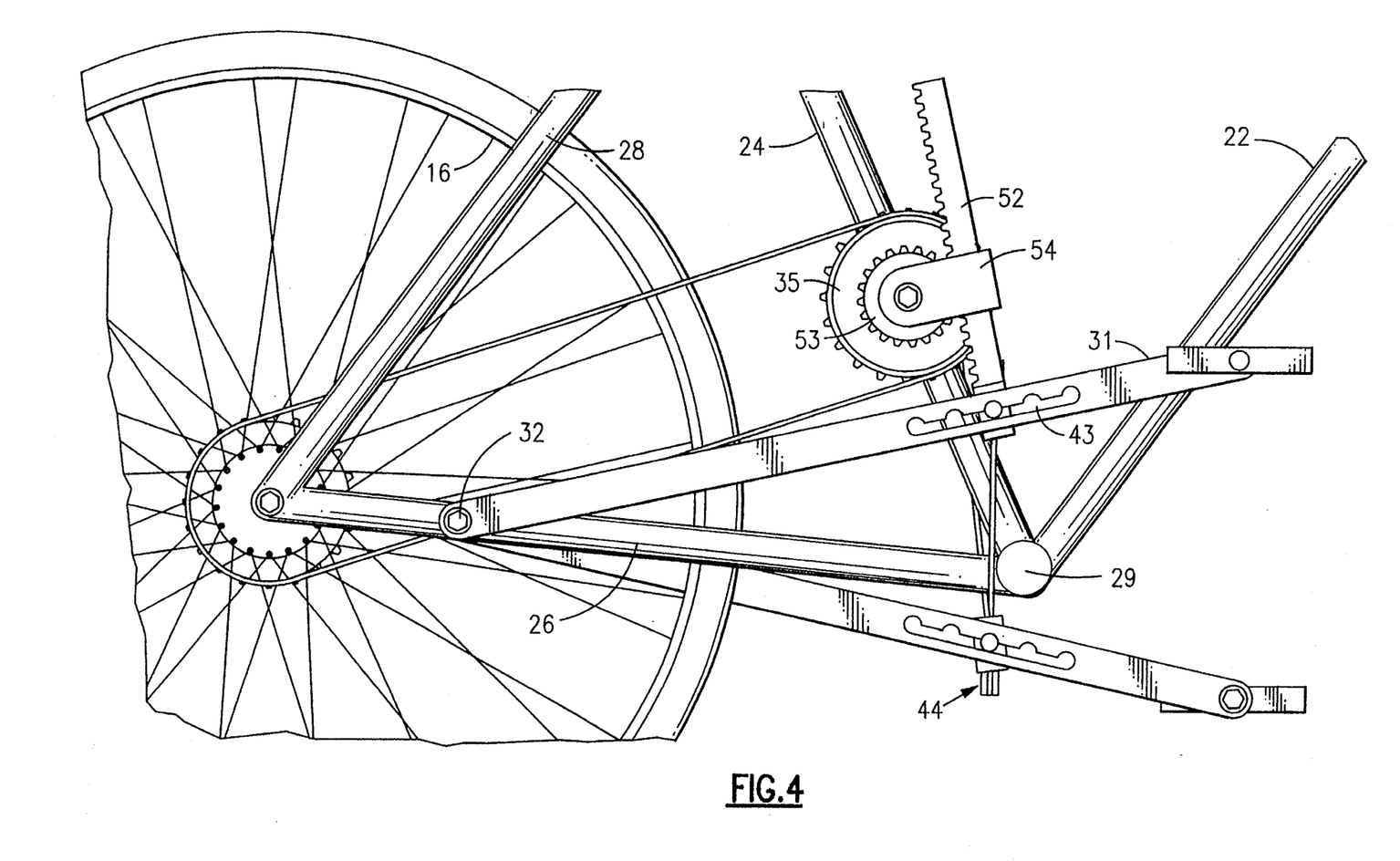
FIG. 4 is an enlargement portion of a side elevation according to another embodiment of the invention.

An alternative arrangement is shown in FIG. 4 which uses the same reference numbers to identify similar parts.

Here rather than the chain 40 and socket 39, this arrangement employs a toothed rack 52 and a toothed wheel 53, one set associated with each side of the frame and each lever 30, 31. A retainer shoe 54 holds the rack bar 52 against the wheel and pivots to permit the angle of the rack bar to change. The bar 52 can be moved from one detent to another in the slot 43 to change the mechanical advantage.

A further embodiment of the invention is shown in FIGS. 5, 6, 7 where again similar parts are identified with the same reference numbers, but in this case raised by 100. The bicycle frame is shown with the down tube 122, and seat tube 124, as well as chain stays 126 and seat stays 128 mounting a rear wheel 116, here shown with a rear sprocket cluster 138 to permit gear shifting.

Figure 5:
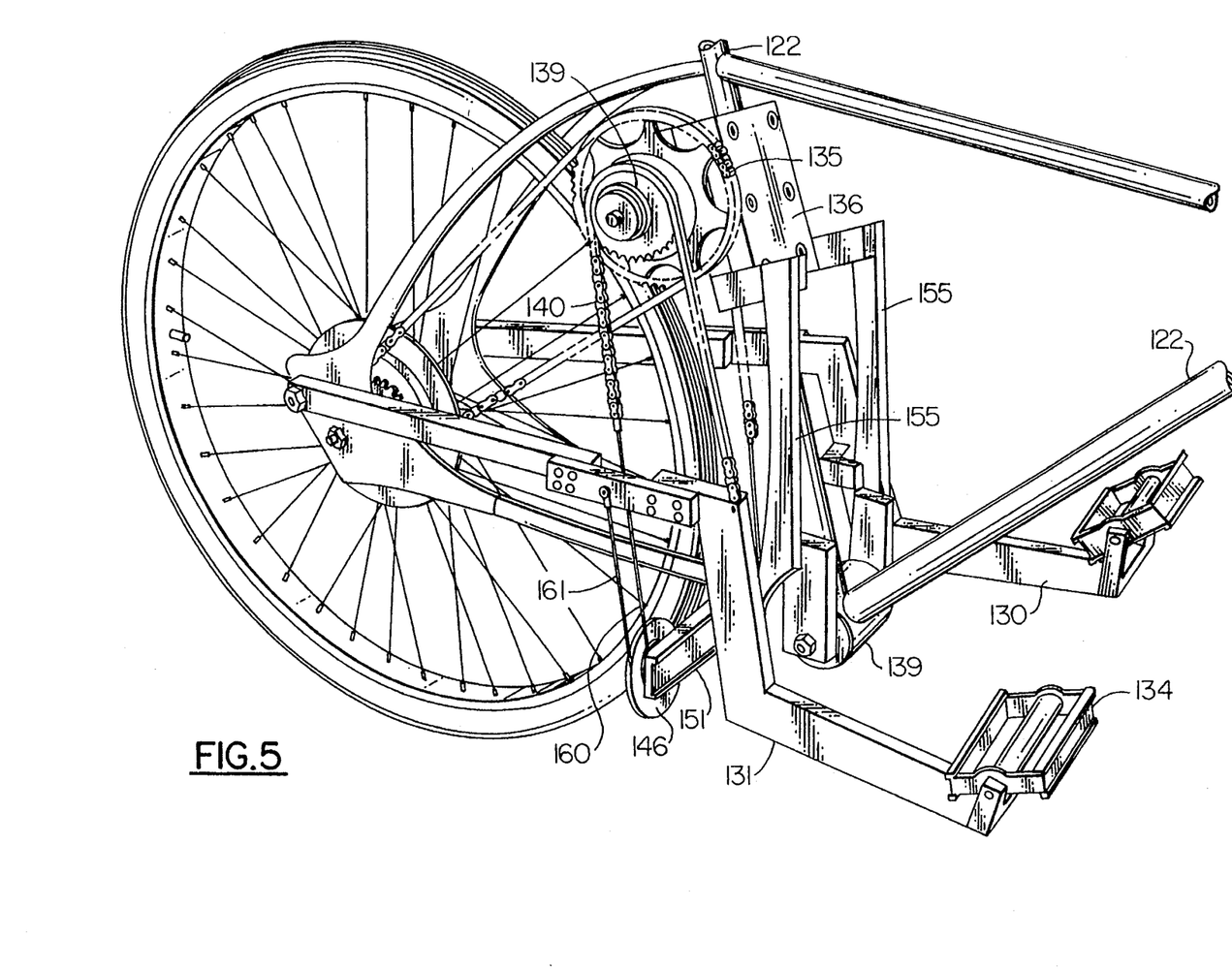
FIG. 5 is a right side perspective view of a pedaled drive mechanism according to another embodiment of the invention.
Figure 6:
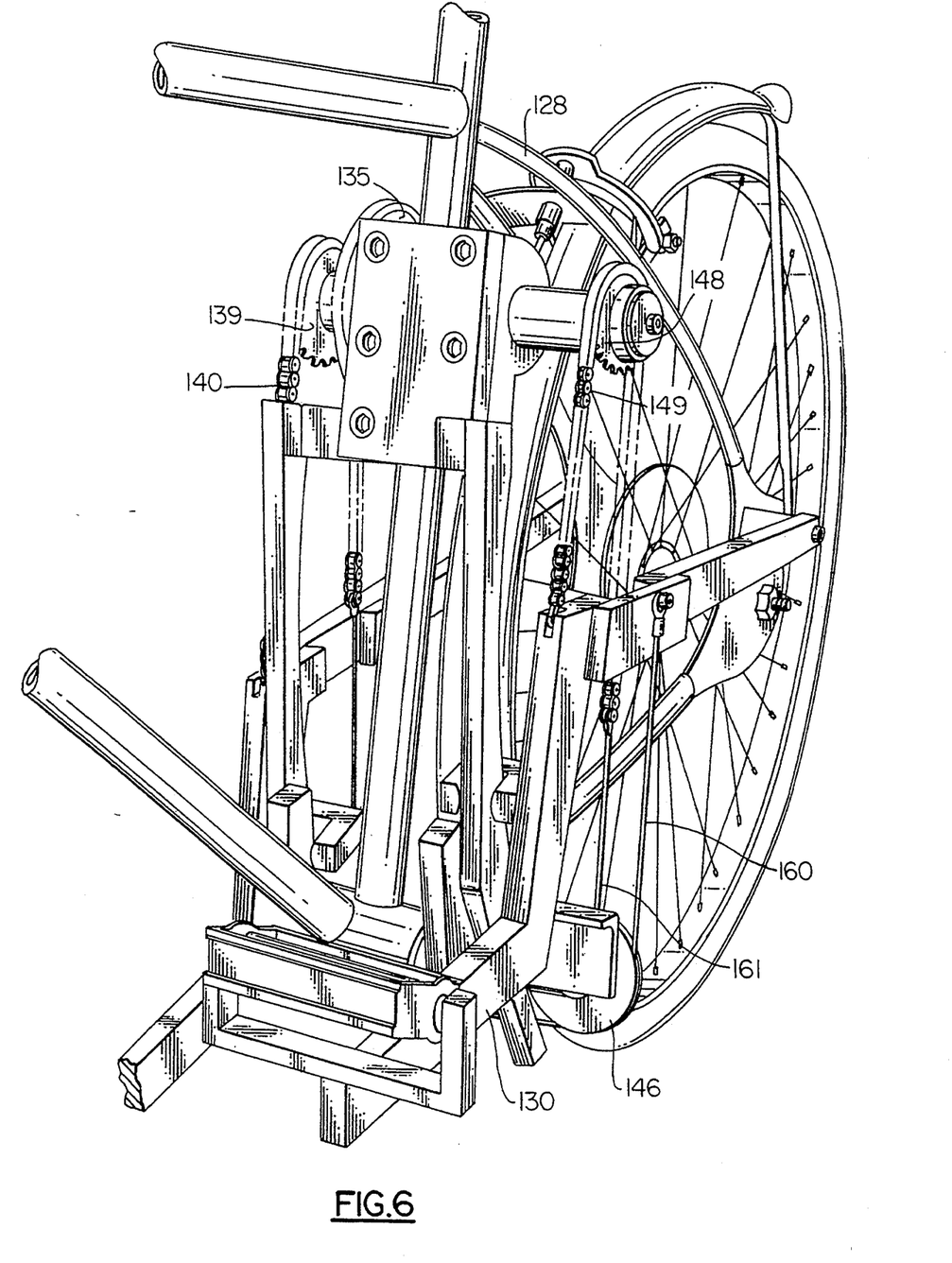
FIG. 6 is a left-side perspective view of the mechanism of this embodiment.
Figure 7:
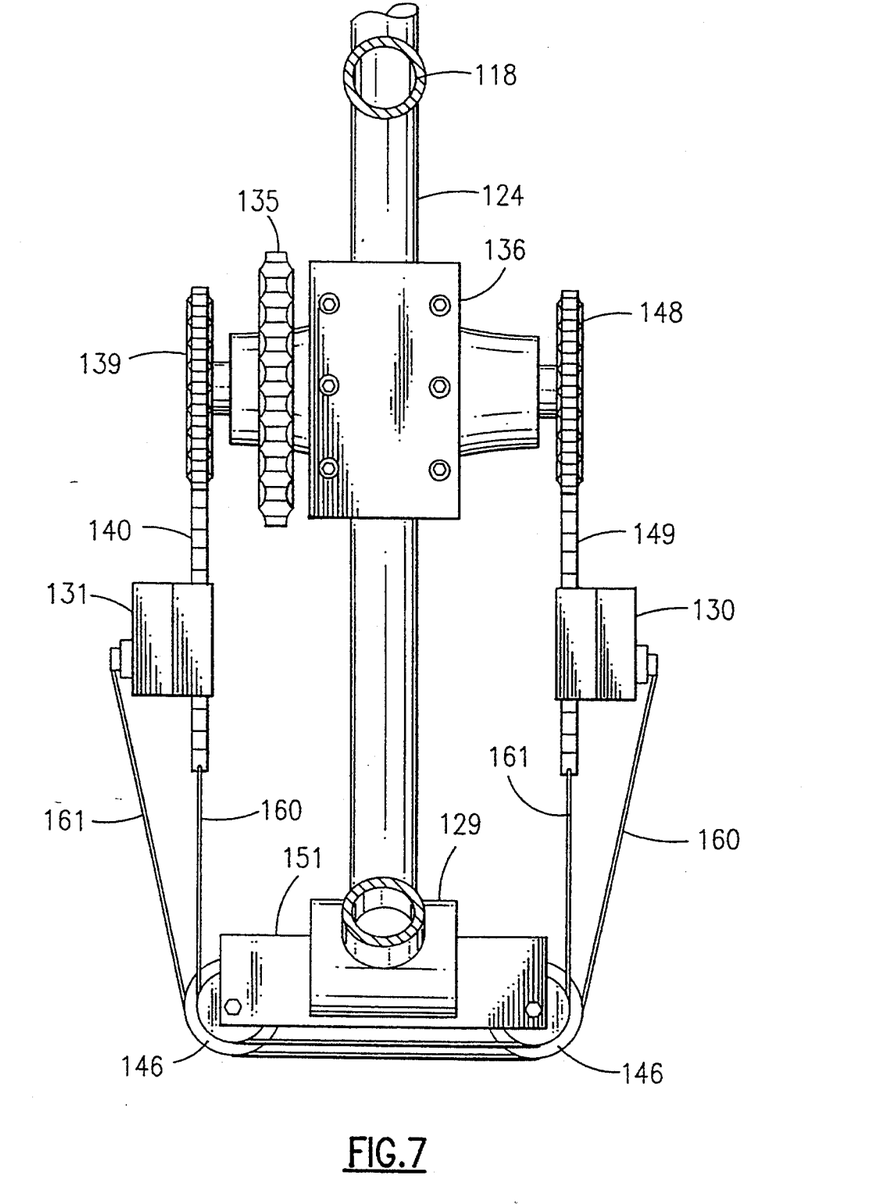
FIG. 7 is a partial elevation showing sprockets and synchronizing mechanism of this embodiment.

Here the pedal levers 130 and 131 have offset forward portions on which the pedals 133, 134 are mounted. The bearing housing 136 is here in the form of a block with guide bars 155 that descent down to the bar 151 that is mounted to the crank housing 129.

The main sprocket 135 as well as one-way sprocket wheels 139 and 148 are coaxially mounted on the bearing housing and respective chains 140,149 pass over the sprocket wheels 139, 148. Each of these is attached to an anchor point on the respective pedal lever 130, 131. The other end of each chain is connected to a respective cable 160 and 161. These cables pass downward, travelling onto the lower idler pulleys 146, and then go back up to the lever 131,130 on the other side of the frame. This system ensures reciprocal motion of the levers 130, 131 and also drives the sprocket wheels 139, 148 in oscillatory motion, which is converted by the ratchet or slip clutch drive means into one-way rotary motion in the main sprocket 135.

The guide bars 155,155 serve to provide sideways support to the pedal levers. A wheel or follower can be provided on the levers 130,131 to follow the guide bars.

This arrangement can easily and readily be applied to other vehicles, such as a recumbent bicycle or tricycle, a paddle wheel water craft, a screw-driven water craft, or a snow or ice craft.

While this invention has been described with reference to selected preferred embodiments, many modifications and variations would present themselves to persons skilled in the art without departing from the present invention, as defined in the appended claims.

What is claimed is:

1. A foot powered arrangement for propelling a vehicle comprising a frame; positioning means on said frame for positioning a person thereon; rotary propelling means supported on said frame for moving said frame relative to a stationary environment; a rotary drive member on said frame for imparting rotary motion to said propelling means to drive same; left and right pedal levers mounted on respective pivots; left and right pedals mounted on the respective pedal levers against which said person on the positioning means can apply foot pressure to move the levers in a reciprocating motion about said pivots; respective left and right one-way rotary members mounted on left and right sides of said frame and rotationally coupled to said rotary drive member such that oscillatory rotating motion of the one-way rotary members produces unidirectional rotation of said rotary drive member; a set of idler pulleys mounted on said frame; a first drive web mounted at one end to the left lever, passing over said left one-way rotary member, then over said set of pulleys to the right side of the frame and connected at its other end to the right lever; and a second drive web mounted at one end to the right lever, passing over said right one-way rotary member, then over said set of pulleys to the left side of the frame, and connected at its other end to the left lever, so that movement by each of said levers corresponds to movement in the opposite direction by the other lever.

2. A foot powered arrangement for propelling a vehicle comprising a frame; positioning means on said frame for positioning a person thereon; rotary propelling means supported on said frame for moving said frame relative to a stationary environment; a rotary drive member on said frame for imparting rotary motion to said propelling means to drive same; left and right pedal levers mounted on respective pivots on left and right sides of the frame; left and right pedals mounted on the respective pedal levers against which said person on the positioning means can apply foot pressure to move the levers in a reciprocating motion about said pivots; synchronizing means mechanically coupling said pivot levers to one another relative to said frame so that movement by each of said levers corresponds to movement in an opposite direction by the other lever; respective left and right one-way rotary members mounted on left and right sides of said frame and rotationally coupled to said rotary drive member such the oscillatory rotating motion of the one-way rotary members produces motion in said rotary drive member; and left and right linkages connecting said left and right pedal levers respectively to said left and right rotary members such that the reciprocating motion of said levers produces said oscillatory motion in said one-way rotary members, resulting in rotation of said rotary drive members to power said rotary propelling means; wherein said synchronizing means includes a loop of a flexible web passing over upper and lower pulley members, and disposed generally between said pedal levers, with said loop being attached on one side to said left pedal lever and on the other side to said right pedal lever.

3. The foot powered arrangement of claim 2 wherein said frame is a bicycle frame having a seat tube and a pair of chain stays, said rotary propelling means includes a rear wheel mounted between said chain stays, said rotary drive member includes a chain drive having a rear sprocket on said rear wheel, a front sprocket supported on a bearing housing attached to said seat tube, and a drive chain engaging said front and rear sprockets, said one way rotary members are coupled through respective one-way clutch members to said front sprocket, and said left and right linkages are operative to oscillate said left and right one-way rotary members in response to reciprocating motion of said pedal levers.

4. The foot powered arrangement of claim 3 wherein said linkages include toothed racks which engage teeth of said left and right one-way rotary members.

5. The foot powered arrangement of claim 2 wherein said linkages include flexible web members passing over pulley wheels of said left and right one-way rotary members.

6. The foot powered arrangement of claim 3 wherein said pivots for said pedal levers are mounted on said chain stays forward of a mounting of said rear wheels.

* * * * *